United States Patent [19]

Ishizeki

[11] Patent Number: 4,895,021

[45] Date of Patent: Jan. 23, 1990

[54] METHOD OF TESTING A VEHICLE ACCELERATION SENSOR FOR AN ANTI-LOCK BRAKE CONTROL SYSTEM

[75] Inventor: Seiichi Ishizeki, Tokyo, Japan

[73] Assignee: Fuji Jukogyo Kabushiki Kaisha, Tokyo, Japan

[21] Appl. No.: 304,174

[22] Filed: Jan. 31, 1989

[30] Foreign Application Priority Data

Feb. 3, 1988 [JP] Japan .................................. 63-23526

[51] Int. Cl.$^4$ ............................................ G01M 15/00
[52] U.S. Cl. ..................................... 73/118.1; 73/129
[58] Field of Search ..................... 73/118.1, 121, 129, 73/2; 340/52 R, 52 B; 303/92

[56] References Cited

U.S. PATENT DOCUMENTS

| 3,362,757 | 1/1968 | Marcheron | 73/129 |
| 3,953,080 | 4/1976 | Bremer | 303/92 |
| 4,192,180 | 3/1980 | Gerstenmeier et al. | 73/121 |
| 4,252,014 | 2/1981 | Ruof | 73/129 |

FOREIGN PATENT DOCUMENTS

| 2612461 | 1/1977 | Fed. Rep. of Germany | 303/92 |
| 1312489 | 5/1987 | U.S.S.R. | 73/2 |

Primary Examiner—Robert R. Raevis
Attorney, Agent, or Firm—Beveridge, DeGrandi & Weilacher

[57] ABSTRACT

A vehicle acceleration sensor forming a part of an anti-lock brake control system is tested mounted on a motor vehicle to see if the sensor will be activated at a predetermined degree of vehicle deceleration. A check signal is first impressed to a sensor check terminal of a control circuit included in the anti-lock brake control system, thereby causing the control circuit to light up a warning lamp. The motor vehicle is then moved onto a ramp having an angle with respect to the plane of the horizon corresponding to the predetermined degree of vehicle deceleration. If the sensor is activated on the ramp, the warning lamp is extinguished to indicate the proper functioning of the sensor. The warning lamp remains glowing if the sensor is not activated on the ramp for some inherent trouble or because of errors in mounting the sensor of the vehicle.

5 Claims, 3 Drawing Sheets

METHOD OF TESTING A VEHICLE ACCELERATION SENSOR FOR AN ANTI-LOCK BRAKE CONTROL SYSTEM

BACKGROUND OF THE INVENTION

This invention relates to a method of testing a vehicle acceleration sensor, included in an anti-lock brake control system for motor vehicles.

Hydraulic brake systems for motor vehicles are usually equipped with some form of anti-lock brake control system, or anti-skid system, in order to prevent wheel lockup during braking. Skidding will occur if the brakes lock the vehicle wheels. Japanese Patent Laid-Open Publication No. 60-61354 represents an example of anti-lock brake control systems so far suggested.

Generally, in hydraulic brake systems, brake fluid is sent from a master cylinder to wheel cylinders at respective vehicle wheels upon application of a brake pedal. The wheel cylinders act to slow or stop the revolving wheels, which in turn slow or stop the vehicle. The anti-lock brake control system acts to stop the supply of the brake fluid to the wheel cylinders, or to release the fluid pressure in the wheel cylinders, as required by the deceleration of the wheels or by the decrease of the wheel speed in relation to vehicle velocity. The wheel speed will build up again and come close to the vehicle velocity as a result of reaction from the road after the fluid pressure in the wheel cylinders is released. Thereupon the control system will restart the delivery of the brake fluid to the wheel cylinders. The same cycle of brake pressure control is repeated thereafter for the most efficient braking.

The above cyclic application and release of the brake pressure as required by the wheel speed have a problem, however. The vehicle is efficiently braked in this manner only when traveling on a road that has a relatively high coefficient of friction and from which, in consequence, the vehicle wheels receive relatively high reaction. When the vehicle is traveling on a road having a lower coefficient of friction, the wheels tend to lock upon application of slight braking effort. The wheel speed will not readily build up because of insufficient reaction from the road after the fluid pressure in the wheel cylinders is reduced by the brake control system. The vehicle must then remain in the state of reduced brake pressure for an extended period of time. Furthermore, as the control system permits the redelivery of the brake fluid to the wheel cylinders to some extent after the wheel speed has built up again, the resulting braking forces will be more than that by the road. The wheels will then skid.

The above discussed problem becomes more prominent when the drive wheels of the vehicle are subject to engine braking. Thus, more particularly, four wheel drive vehicles have been affected by this drawback of the anti-lock brake control system.

Recently, therefore, it has been suggested to incorporate a vehicle acceleration sensor into the anti-lock brake control system. When the vehicle is braked on a road with a low coefficient of friction, the deceleration of the vehicle sensed by the acceleration sensor will be less than a predetermined limit. Then the control system either delays the repressurization of the wheel cylinders or incrementally pressurizes the wheel cylinders in order to defeat the noted shortcoming of the conventional control system.

One known form of the vehicle acceleration sensor is a mercury switch having a mass of mercury contained in a tilting tubular container. The deceleration of the vehicle causes the mercury to move within the container and bridge the switch contacts therein. Conventionally, this and other types of vehicle acceleration sensors have been tested for proper functioning before they are mounted in place on motor vehicles. Such tests are unsatisfactory because there is no guarantee that the tested sensors will function properly after they are mounted on motor vehicles as parts of the anti-lock brake control system.

SUMMARY OF THE INVENTION

The present invention provides a simple and readily practicable method of accurately testing vehicle acceleration sensors as actually mounted in place on motor vehicles and incorporated in their anti-lock brake control systems.

Briefly, according to the method of the invention, a sensor check terminal and a warning device such as a lamp are connected to a control circuit which is included in a anti-lock brake control system of a motor vehicle. The vehicle acceleration sensor to be tested is mounted in place on the vehicle and electrically connected to the control circuit to enable the same to control the amount of rotational anti-lock as required by the degree of vehicle deceleration during braking. The testing of the acceleration sensor on the vehicle starts with the application of a check signal to the sensor check terminal. The control circuit responds to the check signal by lighting up the warning lamp. Then the vehicle with the glowing warning lamp is tilted, as by being moved onto a ramp, to an angle corresponding to a prescribed degree of vehicle deceleration at which the acceleration sensor is expected to be actuated. The warning lamp goes out if the acceleration sensor is activated upon tilting the vehicle. If not, the warning lamp remains glowing, warning that the sensor has malfunction.

It is thus seen that the vehicle acceleration sensor can be accurately tested to ascertain whether or not it will be actuated at the required degree of vehicle deceleration after having been mounted to a motor vehicle and connected as a part of the anti-lock brake control system.

Preferably, in the practice of the inventive method, the control circuit may be constructed to light up the warning lamp only in response to the check signal received within a predetermined time after engine startup. The glowing lamp indicates that the control circuit is in the sensor check mode. Further, for testing the acceleration sensor, the vehicle may be moved onto a ramp or otherwise tilted within another predetermined time after the warning lamp is lit up.

The noted time limitations are useful to prevent the warning lamp from glowing when the sensor check terminal is accidentally excited during driving. Although the lamp will glow if the check terminal is excited within the first preassigned time after engine startup, the driver can be thereby warned of the inadvertent excitation of the check terminal. The lamp will continue glowing unless the vehicle decelerates at the predetermined rate or travels up an equivalent slope immediately thereafter. The driver is thereby assured of the proper functioning of the circuitry.

The above and other features and advantages of this invention and the manner of realizing them will best be understood from a study of the following description and appended claims, with reference had to the attached drawings showing a preferred mode of carrying out the invention.

DETAILED DESCRIPTION OF THE INVENTION

Figure 1:
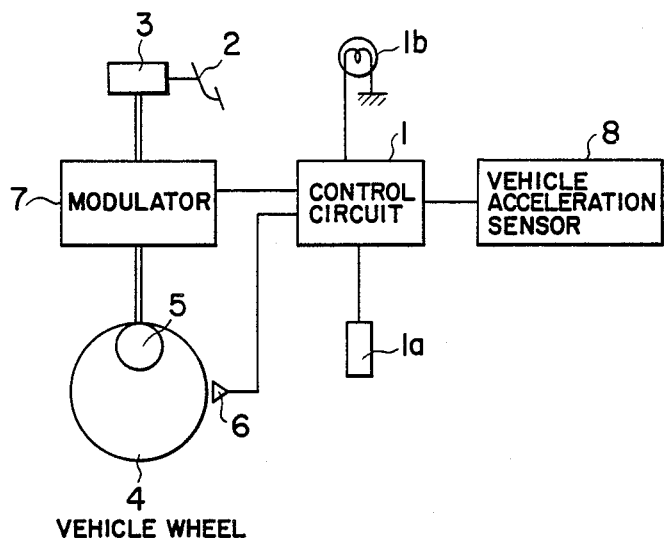
FIG. 1 is a block diagram of a motor vehicle anti-lock brake control system equipped for testing the vehicle acceleration sensor incorporated therein by the method of the invention.

The method of the invention will now be described more specifically in the environment of the motor vehicle anti-lock brake control system illustrated diagrammatically in FIG. 1. Seen at 1 in this Figure is a control circuit for automatically controlling the amount of rotational anti lock during braking. A brake pedal 2 is mechanically linked to a master cylinder 3. As is well known, the master cylinder 3 sends hydraulic brake fluid to individual brakes 5 at respective vehicle wheels 4 upon application of the brake pedal 2. FIG. 1 shows only one representative vehicle wheel 4 together with the associated brake 5 for simplicity. It is understood that the other unshown brakes on the other unshown wheels are controlled in the same manner.

The control circuit 1 is electrically connected to a modulator 7 interposed between the master cylinder 3 and each wheel brake 5. Also connected to the control circuit 1 are a wheel speed sensor 6 at each vehicle wheel 4, and a vehicle acceleration sensor 8.

Figure 5:
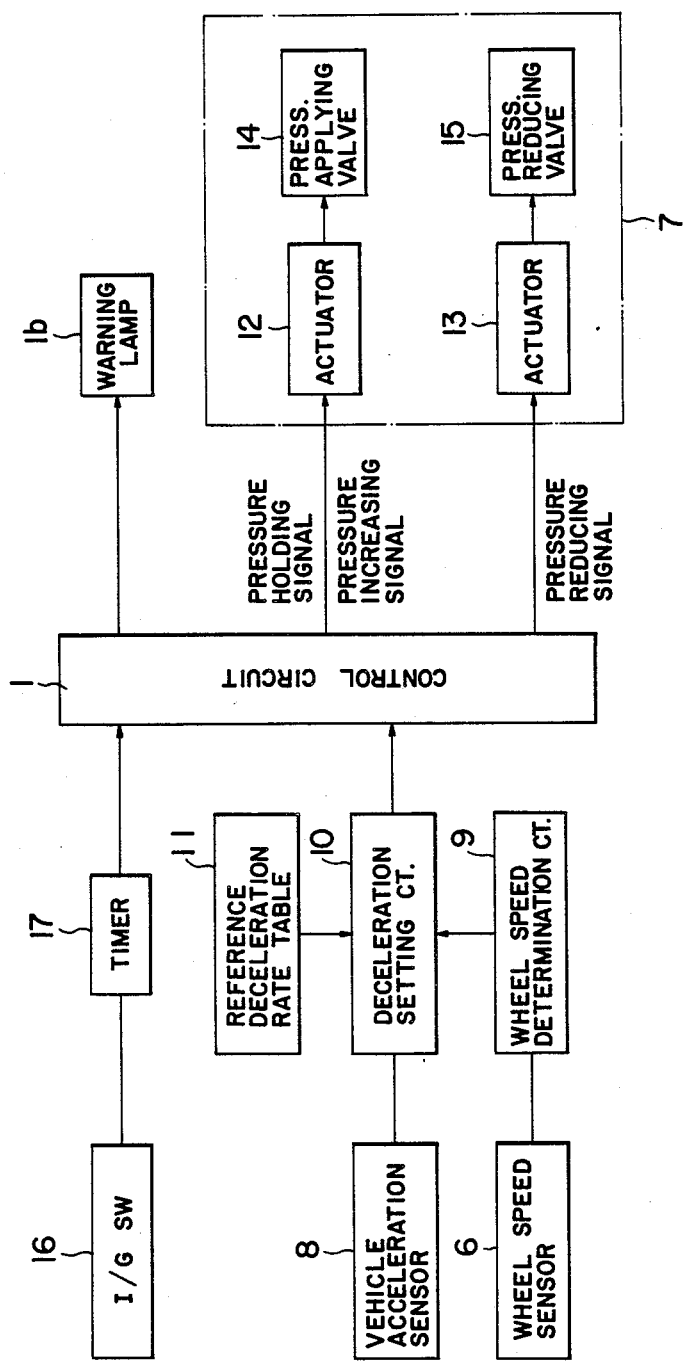
FIG. 5 shows a schematic illustration of the anti-lock brake control system.

Referring to FIG. 5 showing a schematic illustration of the anti-lock brake control system, the signal of the wheel speed detected by the wheel speed sensor 6 is sent to a wheel speed determination circuit 9 from which a wheel speed signal is sent to a deceleration setting circuit 10 in which the wheel speed signal is compared with a reference deceleration table 11 to thereby determine a constant to be multiplied with the value of the wheel speed signal. The value of the output control signal from the deceleration setting circuit 10 is thus determined and delivered to a control circuit 1, which is activated by signal from the vehicle acceleration sensor (G-sensor) 8.

Thus, pressure holding, increasing and/or reducing signals are delivered from the control circuit 1 to actuator 12 or 13 to actuate a pressure applying valve 14 or a pressure reducing valve 15 of the modulator 7.

On the other hand, I/G switch 16 and timer 17 are connected to the control circuit 1.

When the output from each wheel speed sensor 6 shown in FIG. 5 indicates deceleration of the associated vehicle wheel 4 at a prescribed rate by comparing the output with the data in the table 11 as a result of application of the brake pedal 2, the control circuit 1 responds by signaling the modulator 7 to hold the corresponding wheel brake 5 under constant hydraulic fluid pressure to actuate a pressure applying valve 14. If the wheel speed further drops thereafter, the control circuit 1 again signals the modulator 7 to decrease the pressure by opening a pressure reducing valve 15 on the wheel brake 5. Then, as the deceleration of the vehicle wheel decreases thereafter, the control circuit resignals the modulator to hold the wheel brake 5 under constant fluid pressure to actuate the valve 14. The wheel speed may then pick up as a result of reaction from the road and come close to the traveling speed of the vehicle. Thereupon the control circuit 1 resignals the modulator 7 to incrementally increase the fluid pressure to actuate the valve 14 on the wheel brake 5.

Thus the hydraulic fluid pressure on each wheel brake is cyclically increased by the pressure applying valve 14 and decreased by the pressure reducing valve 15 for optimum vehicle deceleration. In order to help determine the moments at which the brake fluid pressure is increased and decreased, the vehicle acceleration sensor 8 puts out a signal that goes high when the vehicle decelerates at, say, 0.40 G plus or minus 0.04.

The anti-lock brake control method as so far set forth has been well known in the art, and therein lies no feature of the invention. The novel features of the invention will appear in the course of the following description.

Several different types of vehicle acceleration sensors have been suggested. One is the noted mercury switch comprising a tube of vitreous material disposed at an angle to the plane of the horizon. The mercury contained in the tube moves with vehicle deceleration for opening and closing the switch contacts within the tube. Another type employs a weight resiliently supported within an enclosure. The displacement of the weight due to vehicle deceleration is detected electrically, as from the physical contact of the weight with the enclosure.

Regardless of the type, vehicle acceleration sensors have heretofore been tested for proper functioning before they are mounted in place on motor vehicles. As far as the applicant is aware, no practical method has been available for testing the operation of the sensors after they are mounted on vehicles, as at vehicle assembly lines. The present invention provides a simple and truly practicable method of checking the vehicle acceleration sensor 8 after it is mounted in place on a motor vehicle and connected as a part of the anti-lock brake control system configured as illustrated in FIG. 1.

Figure 4:
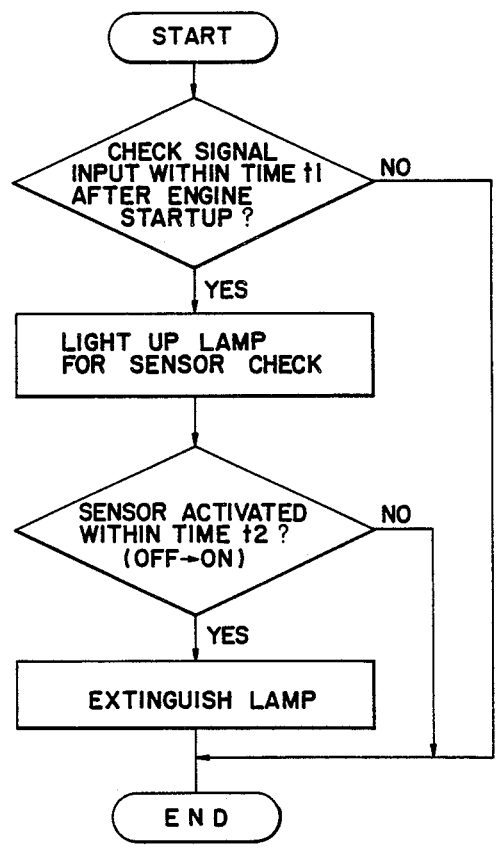
FIG. 4 is a flow chart explanatory of the sequential steps of testing the acceleration sensor by the method of the invention.

The method of the invention requires the connection of a sensor check terminal 1a and a suitable indicator or warning device such as a lamp 1b to the control circuit 1. Reference may be had to both the timing diagram of FIG. 2 and the flow chart of FIG. 4 for the following detailed discussion of the inventive method.

Figure 2:
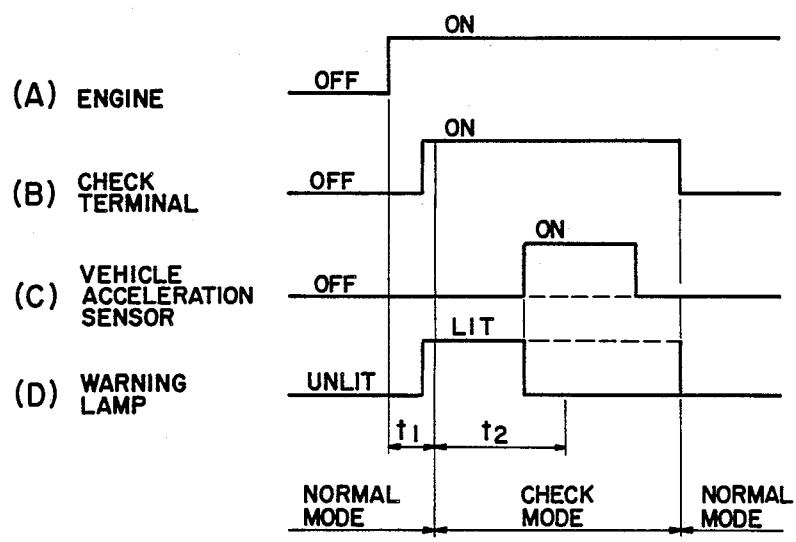
FIG. 2, consisting of (A) through (D), is a timing diagram explanatory of how the vehicle acceleration sensor is tested by the method of the invention.

The inventive method dictates, first of all, the application of a sensor check signal (e.g. 12 volts supply voltage) to the check terminal 1a within a predetermined time t1 (e.g. 10 seconds) after the startup of the engine, not shown, by the actuation of an ignition switch, as will be understood from (A) and (B) in FIG. 2. The check signal is intended to initiate the control circuit 1 into a sensor check mode. Thus, in response to the check signal, the control circuit 1 lights up the warning lamp 1b and so visually indicates to the tester that the control circuit has entered the sensor check mode.

Figure 3:
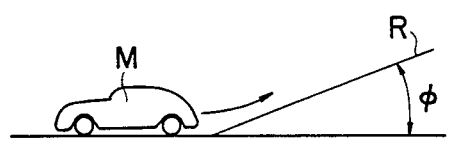
FIG. 3 is a diagrammatic illustration of the motor vehicle being moved onto a ramp for simulating vehicle deceleration in testing the acceleration sensor by the method of the invention.

Then, within another predetermined time t2 (e.g., one minute) after the warning lamp 1b is turned on, the vehicle M is tilted longitudinally, as by being moved over to a suitable ramp or slanting platform having an angle $\Phi$ with respect to the plane of the horizon, as illustrated in FIG. 3. This ramp angle $\Phi$ corresponds to a prescribed degree of vehicle deceleration at which the acceleration sensor 8 is expected to be activated. Thus, if the prescribed degree of vehicle deceleration is 0.4 G, the ramp angle $\Phi$ is 23.5° ($\sin^{-1} 0.4$) The warning lamp 1b is extinguished if the acceleration sensor 8 is properly actuated on the ramp R, as indicated by the solid lines at (C) and (D) in FIG. 2.

Possibly, however, the acceleration sensor being tested may lack in sensitivity or may be mounted to the vehicle M at other than the required angle. In such cases the acceleration sensor will remain unactivated on the ramp R, as represented by the dashed lines at (C) in FIG. 2. The dashed line at (D) in FIG. 2 indicates the continued glowing of the warning lamp 1b as a result of the malfunctioning of the tested acceleration sensor. The warning lamp 1b continues glowing after the vehicle M has traveled away from the ramp R, and is to be extinguished when the application of the check signal to the check terminal 1a is stopped to terminate the sensor check mode.

The warning lamp 1b may remain unlit upon application of the check signal to the check terminal 1a when the vehicle is on a horizontal level surface. Then the acceleration sensor 8 is also malfunctioning, for example due to excessive sensitivity or to angular misplacement of the sensor on the vehicle.

It is understood that the foregoing description represents but one of numerous possible modes of carrying out the invention. Various modifications or alterations may be made in the details of the disclosure without departing from the scope of the invention.

What is claimed is:

1. A method of testing a vehicle acceleration sensor mounted on a motor vehicle, the acceleration sensor forming a part of an anti-lock brake control system which is incorporated with the vehicle and which includes a control circuit relying on the acceleration sensor for automatically controlling an amount of rotational anti-lock during braking, said control circuit having a sensor check terminal for inputting a check signal, and a warning device responsive to said check signal through said control circuit, the method comprising:
    (a) connecting the sensor check terminal and the warning device to the control circuit, warning device being normally held in a first prescribed state and being actuable to a second prescribed state;
    (b) applying a check signal to the sensor check terminal and so causing the control circuit to actuate the warning device from the first to the second prescribed state;
    (c) tilting the motor vehicle into such an angle with respect to the plane of the horizon as to correspond to a predetermined degree of vehicle deceleration at which the acceleration sensor is to be activated; and
    (d) causing the control circuit to deactuate the warning device into the first prescribed stat if the acceleration sensor is activated on tilting the vehicle, the control circuit holding the warning device in the second prescribed state if the acceleration sensor is unactivated on tilting the vehicle.

2. The acceleration sensor testing method of claim 1 wherein the warning device is a lamp which is unlit when in the first prescribed state and lit up in the second prescribed state.

3. The acceleration sensor testing method of claim 1 wherein the motor vehicle is tilted by being moved onto a ramp having the required angle with respect to the plane of the horizon.

4. The acceleration sensor testing method of claim 1 wherein the check signal is applied to the sensor check terminal within a predetermined period of time after the startup of an engine of the motor vehicle.

5. The acceleration sensor testing method of claim 1 wherein the motor vehicle is tilted within a predetermined period of time after the application of the check signal to the sensor check terminal.

* * * * *